United States Patent [19]
Pilz et al.

[11] 3,888,513
[45] June 10, 1975

[54] TRACTOR-TRAILER SERVICE LINE COUPLING

[75] Inventors: Gilbert B. Pilz, Toledo, Ohio; James R. Vivian, Hoffman Estates, Ill.

[73] Assignee: Young Daybrook, Inc., Southfield, Mich.

[22] Filed: Apr. 29, 1974

[21] Appl. No.: 464,781

[52] U.S. Cl. ............................ 280/421; 280/422
[51] Int. Cl. ............................................ B60d 1/08
[58] Field of Search ........................... 280/421, 422

[56] References Cited
UNITED STATES PATENTS

| | | | |
|---|---|---|---|
| 1,973,610 | 9/1934 | Connors | 280/421 |
| 2,048,180 | 7/1936 | Connors | 280/421 |
| 3,388,927 | 6/1968 | Grunberg et al. | 280/421 |
| 3,628,811 | 12/1971 | Rivers | 280/421 |

Primary Examiner—Leo Friaglia
Attorney, Agent, or Firm—Meyer, Tilberry & Body

[57] ABSTRACT

A coupling arrangement is disclosed for automatically connecting air and electrical lines of a spotting tractor to corresponding air and electrical lines of a trailer upon movement of the fifth wheel of the tractor into coupled relationship with the kingpin of the trailer. A male coupling member is mounted on the front wall of the trailer, and a mating female coupling member is mounted on the spotting tractor for pivotal movement in opposite directions about the axis of the fifth wheel and for reciprocating movement toward and away from the latter axis. Service lines for the trailer are connected to the male coupling member, and the service lines of the tractor are connected to the female coupling member, whereby the service lines are operatively interconnected upon mating engagement between the coupling members.

16 Claims, 8 Drawing Figures

PATENTED JUN 10 1975    3,888,513

SHEET 1

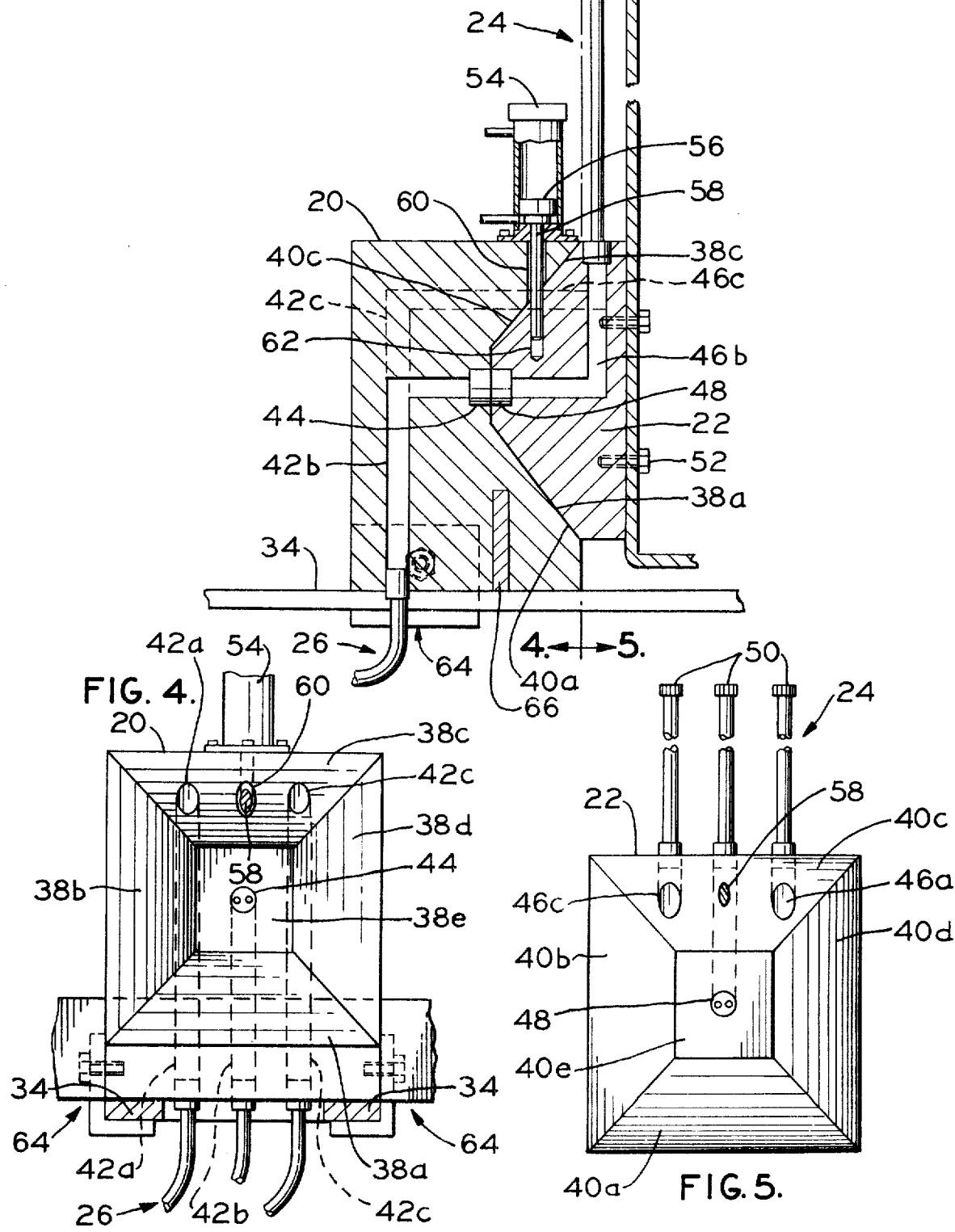

TRACTOR-TRAILER SERVICE LINE COUPLING

This invention relates to the art of articulated motor vehicles and, more particularly, to a coupling arrangement for connecting the service lines of a trailer with corresponding service lines of a tractor.

As is well known in the art of articulated vehicles, the kingpin of a trailer is adapted to be releaseably and pivotally interconnected with the fifth wheel of a tractor for the latter to transport the trailer from one location to another. Such vehicle combinations are employed for transporting a wide variety of goods which are loaded on or in the trailer at the one location and which are unloaded from the trailer at the other location. Often, at the one or other locations and/or at one or more locations therebetween, the primary tractor is uncoupled from the trailer and a spotting tractor is coupled therewith to move the trailer within a service area. Such spotting operations are employed, for example, to park the trailer within the service area or to position the trailer with respect to a loading or unloading platform or the like. Spotting tractors are employed for such operations to allow the primary tractor to continue in service as a primary moving vehicle without delays that may be occasioned as a result of having to park the trailer or await availability of platform space and/or personnel for loading and unloading operations.

Tractors are generally provided in such a yard or service area specifically for spotting operations, and it will be appreciated that the operator of the spotting tractor is required to move the tractor into coupled relationship with respect to trailers a considerable number of times during a given working period. Moreover, when the primary moving tractor is uncoupled from the trailer the operator of the latter must necessarily disconnect the air and electrical service lines between the tractor and trailer by which the air brakes and lights of the trailer are interconnected with air and electrical sources carried by the tractor. Accordingly, when the driver of the spotting tractor couples the latter tractor with a given trailer it becomes necessary to reconnect the trailer service lines with the spotting tractor service lines to provide for operation of the air brakes and lights of the trailer during the spotting operation.

Heretofore, such coupling and uncoupling of air and electrical services lines between a tractor and trailer most often requires that the driver of the tractor leave the cab area and manually connect and disconnect coupling components provided between the tractor and trailer units. It will be appreciated, especially in connection with spotting operations, that such manual coupling and uncoupling operations are time consuming as well as inconvenient to the operator as a result of his having to get into and out of the cab of the tractor each time the service lines are to be connected or disconnected from one another. Over a given working period, a considerable amount of productive time is lost as a result of such requirements of the driver and, moreover, the driver is greatly inconvenienced and subjected to hazardous health conditions by having to leave and re-enter the tractor during periods of adverse weather conditions, such as rain or snow.

In accordance with the present invention, a service line coupling arrangement is provided by which air and electrical service lines of a tractor are coupled to corresponding air and electrical service lines of a trailer upon movement of the tractor into drivable interconnection with the trailer. More particularly, mating male and female service line coupling members are mounted one on the tractor and one on the front wall of the trailer for movement into mating interengagement when the tractor and trailer are moved into coupled interconnection. The coupling member carried by the tractor is connected to the air and electrical supply lines of the tractor, and the coupling member carried on the front wall of the trailer is connected to points of delivery of the air or electrical power, such as the air brake units and lights of the trailer. Therefore, when the male and female coupling members are moved into mating engagement the supply lines of the tractor and trailer are interconnected independent of any manually coupling operation on the part of the driver of the tractor.

In accordance with a preferred embodiment of the invention, the service line coupling member mounted on the tractor is supported for pivotal movement in opposite directions with respect to the axis of the fifth wheel on the tractor and is further supported for reciprocating movement radially of the fifth wheel axis. The pivotal and reciprocating capability of the coupling member facilitates orientation of the coupling member relative to the mating coupling member on the trailer wall during movement of the tractor into interengagement with the trailer. Accordingly, should the tractor be angularly related to the trailer during movement into interengagement therewith, the service line coupling member on the tractor is pivoted relative to the fifth wheel axis into proper alignment for mating engagement with the service line coupling member on the front wall of the trailer. Reciprocating movement of the coupling member on the tractor provides for accommodating coupling engagement thereof with mating coupling members mounted on trailers at different distances from the axis of the trailer kingpin. In this respect, trailer kingpins are located at different distances from the front edge of the trailer, whereby a coupling member radially fixed relative to the fifth wheel axis of a tractor would limit service line coupling to trailers having a corresponding distance between the kingpin axis and the coupling member mounted on the trailer.

The male and female coupling members are disposed in facial contact upon aligned interengagement therebetween and, preferably, the coupling member mounted on the tractor is biased toward the fifth wheel axis to maintain facial contact between the coupling members. Moreover, in the preferred embodiment, the male and female coupling members are releaseably interengaged in mating relationship by a motor actuated pin arrangement to assure maintenance of sealing contact between the faces thereof. The pin arrangement can be actuated in conjunction with the actuation of clamping jaws which, as is well known, are actuated to clampingly engage the kingpin of the trailer when the tractor and trailer are interengaged. Accordingly, upon release of the clamping jaws the motor driven pin arrangement is actuated to disconnect the male and female coupling members, whereby the tractor can be moved away from the trailer and the male and female coupling members move away from one another to break the service line connection. It will be appreciated, therefore, that the service line coupling and uncoupling operations are achieved without requiring movement of the driver of the tractor out of the tractor cab.

Accordingly, an outstanding object of the present invention is the provision of a quick connect and disconnect coupling arrangement for service lines between a tractor and trailer.

Another object is the provision of a coupling arrangement of the foregoing character which is operable upon movement of the tractor and trailer into interengaged relationship.

Yet another object is the provision of a coupling arrangement of the foregoing character which is comprised of mating male and female coupling members relatively movable for proper mating engagement therebetween in response to movement of the tractor into interengagement with the trailer.

Still another object is the provision of a coupling arrangement of the foregoing character which is operable upon mating interengagement between the male and female coupling members to bias the coupling members into facial contact.

A further object is the provision of a coupling assembly of the foregoing character in which one of the male and female coupling members is mounted on the tractor for pivotal movement in opposite directions about the axis of the tractor fifth wheel to facilitate orientation of the one coupling member with respect to the mating coupling member on the trailer.

Still a further object is the provision of a coupling arrangement of the foregoing character in which one of the male and female coupling members is mounted on the tractor for reciprocating movement toward and away from the axis of the tractor fifth wheel, whereby the one coupling member is adapted to be positioned at different distances radially of the fifth wheel axis to accommodate coupling with mating coupling members mounted on trailers at various distances from the trailer kingpin axis.

Yet a further object is the provision of a coupling arrangement of the foregoing character which is comprised of a minimum number of parts operatively interrelated to provide efficiency in operation.

The foregoing objects and others will in part be obvious and in part pointed out more fully hereinafter in connection with the written description of a preferred embodiment of the invention illustrated in the accompanying drawings in which:

FIG. 3 is a detailed sectional elevation view of the coupling components, the view being along line 3—3 in FIG. 2;

FIG. 4 is an elevation view of the female coupling member as seen along line 4—4 in FIG. 3;

FIG. 5 is an elevation view of the male coupling member as seen along line 5—5 in FIG. 3;

Figure 1:
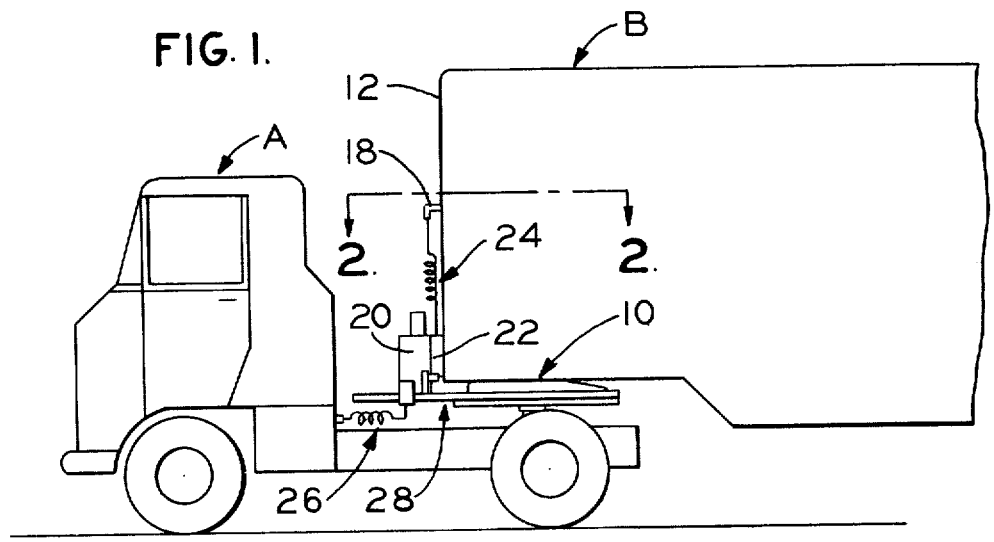
FIG. 1 is a side elevation view of a tractor and trailer combination including the coupling arrangement made in accordance with the present invention.

Referring now in greater detail to the drawings wherein the showings are for the purpose of illustrating a preferred embodiment of the invention only and not for the purpose of limiting the invention, a tractor-trailer unit is illustrated in FIG. 1 which is comprised of a spotting tractor A and a trailer B. Tractor A is provided with a fifth wheel 10 which, in a well known manner, is adapted to receive a kingpin provided on trailer B so that the tractor and trailer are interconnected to provide an articulated vehicle unit. Trailer B may be of any size and design, and in FIG. 1 the trailer is of box-like structure and includes a front wall 12 facing the cab portion of tractor A.

As is well known, the wheels of such trailers are generally provided with air brake units, and the trailer is provided with suitable brake lights, stop lights, turn signal lights, and the like. The air brake system and lights of the trailer are provided with suitable air lines and electrical conductors leading to the front wall of the trailer and to corresponding coupling devices which enable the air lines and electrical conductors to be coupled with air source and electrical source lines of a primary moving tractor by which the trailer is transported along a highway or the like. In the embodiment illustrated, front wall 12 of the trailer supports coupling components 14, 16 and 18 having ends disposed on opposite sides of wall 12. It will be appreciated that the ends of the couplings disposed behind wall 12 are connected to the air and electrical lines, not illustrated, leading to the trailer air brakes and lights. The ends of the couplings disposed forwardly of wall 12 are adapted to be manually connected and disconnected to corresponding lines provided on a primary tractor. For the purpose of the present disclosure, couplings 14 and 18 are adapted to be connected to tractor air lines and coupling 16 is adapted to be connected to the tractor electrical supply line.

When a trailer of the foregoing character is interconnected with a primary moving tractor for transporting the trailer from one location to another along a highway or the like, the tractor and trailer are first moved into coupled relationship and the air and electrical supply lines from the tractor are then manually connected to the corresponding one of the trailer couplings 14, 16 and 18. Accordingly, each time it is desired to uncouple and recouple the primary mover with the trailer it is necessary to manually disconnect and reconnect the supply line couplings. Generally, such manual coupling and uncoupling operations are performed by the tractor driver and, accordingly, the driver must leave the cab of the vehicle to perform these operations. The primary tractor vehicle is generally employed to transport the trailer for considerable distances, whereby the driver generally will only have to perform the coupling operations at the opposite ends of a given trip. However, prior to or following such a trip, the trailer may be parked in a service area, storage depot, or the like while the primary driving unit is otherwise put to use. During the period in which the trailer is in the service area, it is generally necessary to move the trailer from one location to another within the service area. Moreover, a given trailer may be moved to different locations several times while it is in such a service area or depot. Such movements of the trailer are achieved through the use of a spotting tractor, namely a tractor provided specifically for moving trailers in the service area when and where necessary. In a given working period, the driver of a spotting tractor may move a considerable number of trailers, each of which movements of course requires coupling and uncoupling of the tractor and trailer as well as the supply lines therebetween to provide for operation of the trailer brakes and lights.

In accordance with the present invention, a service line coupling arrangement is provided which is particularly suited to such spotting type operations and which eliminates the necessity of the driver having to leave the cab area to achieve service line connection and disconnection during coupling and uncoupling of the tractor with a trailer. In this respect, as generally illustrated in FIG. 1, the coupling arrangement includes a service line coupling member 20 mounted on tractor A, and a mating service line coupling member 22 mounted on trailer B. As described more fully hereinafter, coupling member 22 is mounted on front wall 12 of the tractor and is provided with service lines designated generally by the numeral 24 and each of which is adapted to be manually coupled with a corresponding one of the coupling members 14, 16 and 18 of the trailer. Coupling member 20 is likewise provided with a plurality of service lines designated generally by the numeral 26 and each of which is suitably connected to a corresponding air or electrical supply source on the tractor.

Coupling member 20 is supported on tractor A by a carrier member 28 for pivotal movement about the axis of fifth wheel 10 and for reciprocating movement radially of the latter axis. As explained more fully hereinafter, support of coupling member 20 in this manner facilitates the lateral positioning thereof relative to coupling member 22 during movement of the tractor into coupled engagement with the trailer, and provides for coupling the tractor supply lines with trailers having kingpins spaced various distances from front wall 12 of the trailer.

Referring now to FIGS. 2-5 of the drawing, carrier member 28 is mounted on the tractor fifth wheel 10 for pivotal movement in opposite directions about the fifth wheel axis 30, which axis coincides with the axis of the trailer kingpin when the tractor and trailer are coupled together. Carrier member 28 includes a circular portion 32 rotatably supported by the fifth wheel, as set forth more fully hereinafter, and an arm portion extending radially of axis 30 and including a pair of arms 34 extending in laterally spaced apart parallel relationship from circular portion 32. Arms 34 have outer ends interconnected by a laterally extending bridging portion 36. Circular portion 32, arms 34 and bridging portion 36 may be formed as an integral unit or may be defined by separate components suitably interconnected with one another.

In the embodiment illustrated, coupling members 20 and 22 are in the form of blocks of metal or plastic material contoured for mating engagement. More particularly, coupling member 20 is provided with a recess in the form of a truncated pyramid having side faces 38a, 38b, 38c and 38d. Similarly, coupling member 22 is provided with a projection in the form of a truncated pyramid having side faces 40a, 40b, 40c and 40d. Further, the recess in coupling member 20 has an inner face 38e, and the projection of member 22 has an outer face 40e. When the coupling members are in assembled relationship, as illustrated in FIG. 3, the side and end faces of the projection are in facial engagement with the corresponding side and end faces of the recess.

Coupling member 20 is provided with three passageways 42a, 42b and 42c. Each of the latter passageways has an end opening through the bottom of the body of coupling member 20, and a corresponding one of the tractor service lines 26 is suitably coupled therewith. In the embodiment illustrated, passageways 42a and 42c are air passageways and passageway 42b is for the electrical service line from the tractor. Accordingly, it will be appreciated that passageway 42b is adapted to receive electrical conductors. Passageways 42a and 42c have outlet ends terminating in openings in side face 38c of the recess in coupling member 20. Passageway 42b has an outlet end at surface 38e of the recess, and the outlet end is provided with a suitable electrical coupling member 44 such as a pronged plug or socket.

Coupling member 22 is provided with passageways 46a, 46b and 46c. Passageways 46a and 46c are air passageways and have inner ends defined by openings in face 40c. Passageway 46b accommodates electrical conductors and has an inner end terminating at face 40e. An electrical coupling component 48 is provided at the inner end of passageway 46b for mating engagement with coupling element 44. The outer ends of passageways 46a, 46b and 46c are suitably connected to the corresponding one of the supply lines 24. Supply lines 24 are flexible and each is provided with a suitable coupling member 50 which facilitates manual connection of the supply lines with the corresponding one of the couplings 14, 16 and 18 on trailer wall 12.

It will be appreciated that air line openings in face 38c are in axial alignment with the air openings in face 40c when coupling members 20 and 22 are matingly interengaged. Likewise, electrical coupling components 44 and 48 are axially aligned for electrical interengagement when the coupling members are matingly engaged.

As mentioned hereinabove, coupling member 22 is mounted on wall 12 of the tractor and is located generally centrally of the lateral width of the wall. Coupling member 22 is mounted in a fixed position on wall 12 against displacement relative thereto such as by means of threaded fasteners 52. Preferably, coupling member 20 supports an air cylinder 54 having a piston 56 reciprocable in the cylinder to axially displace a pin or rod 58 which serves to maintain coupling members 20 and 22 in tightly engaged relationship when coupled. More particularly, coupling member 20 is provided with an opening 60 for rod 58 and coupling member 22 is provided with an opening 62 which is disposed in alignment with opening 60 when the members are in coupled relationship. When the members are initially coupled, the air cylinder is adapted to be actuated to move piston 56 and thus rod 58 downwardly through the aligned openings.

As mentioned hereinabove, coupling member 20 is supported by carrier member 28 for reciprocating movement along arms 34 of the carrier. In this respect, the laterally opposite sides of member 20 are provided with L-shaped mounting brackets 64, each of which includes a leg suitably attached to member 20 and a leg extending inwardly of the corresponding arm and therebeneath. Mounting brackets 64 support member 20 for sliding movement along arms 34 and against lateral and upward displacement therefrom.

Figure 2:
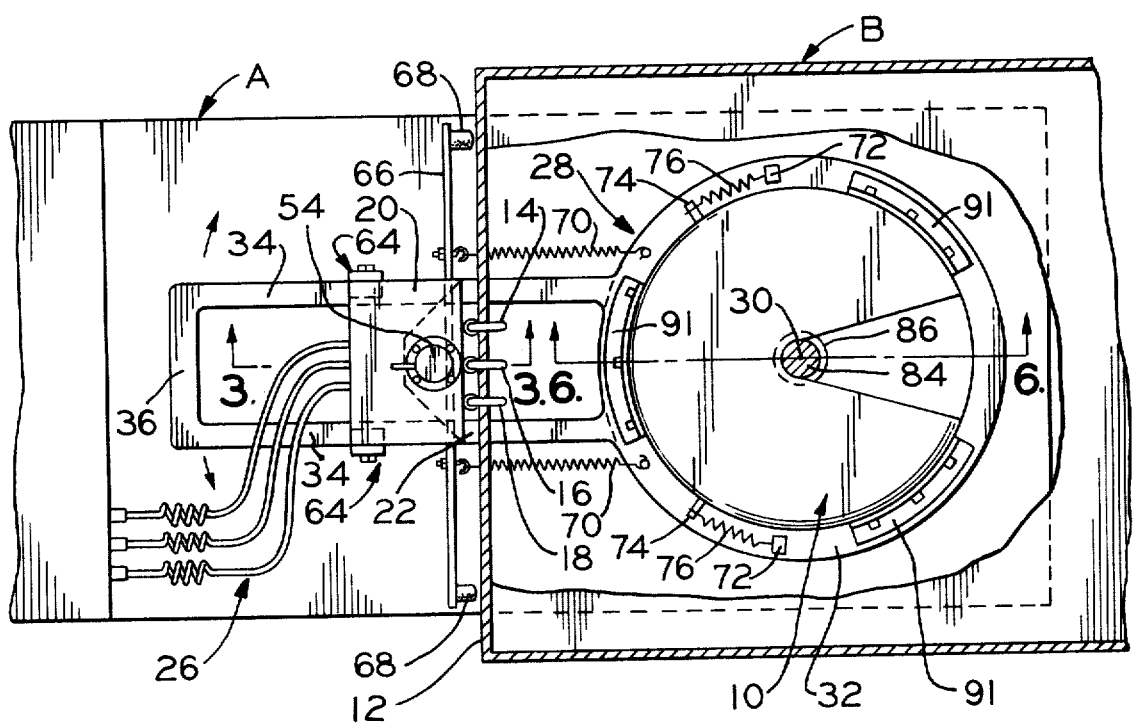
FIG. 2 is a plan view, partially in section, of the coupling arrangement illustrated in FIG. 1, the view being along line 2—2 in FIG. 1.

As best seen in FIG. 2, a positioning arm 66 is provided for coupling member 20. Arm 66 extends laterally from the opposite sides of member 20 and is provided at its laterally opposite ends with abutment members 68 which extend in the direction of trailer wall 12. Any suitable arm structure can be provided and in the embodiment illustrated the arm is a unitary bar extending laterally through the body of coupling member 20 and suitably interconnected therewith so that the bar and coupling member are movable as a unit. Abutment members 68 have a length of extension from arm 66 which provides for the outer ends of the abutment members to be slightly spaced from wall 12 when coupling members 20 and 22 are in coupled engagement.

Arm 66 and coupling member 20 are biased toward fifth wheel axis 30 by a pair of tension springs 70 having opposite ends interconnected one with arm 66 and the other with circular portion 32 of carrier member 28. Further, carrier member 28 is preferably self-centering to provide for the arm portion thereof to seek a neutral position laterally centrally of the tractor, as illustrated in FIG. 2. Any suitable self-centering mechanism can be employed and, in the embodiment illustrated, circular portion 32 of carrier member 28 is provided with fixed spring brackets 72 on laterally opposite sides of the desired center porition, and fifth wheel 10 is provided with corresponding fixed spring brackets 74 circumferentially spaced from brackets 72. Springs 76 have their opposite ends attached to the corresponding brackets 72 and 74, whereby pivotal movement of carrier member 28 in opposite directions about axis 30 from the position illustrated in FIG. 2 tensions one or the other of the springs 76 so as to bias the carrier back toward the neutral position.

Figure 6:
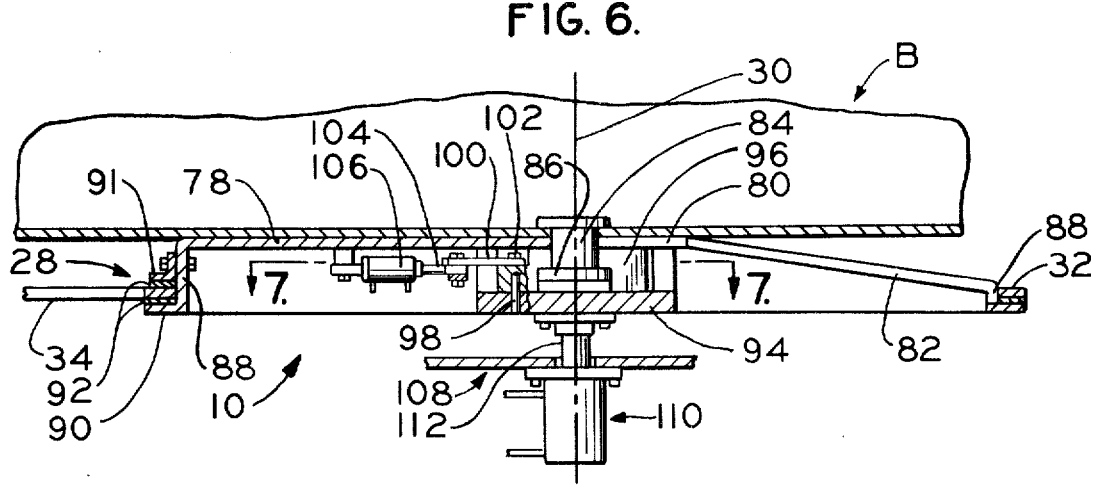
FIG. 6 is a sectional elevation view of the fifth wheel and coupling member carrier of the coupling arrangement, the view being along line 6—6 in FIG. 2.
Figure 7:
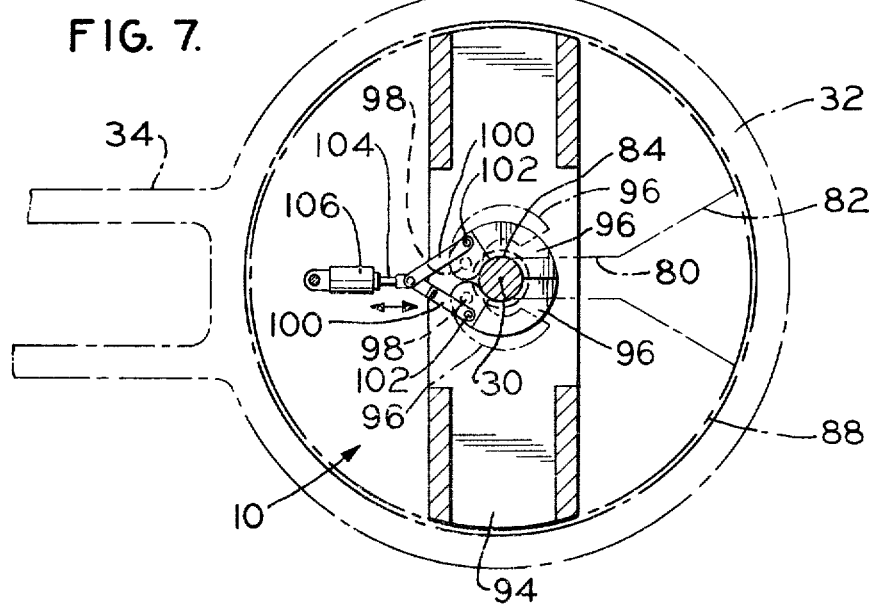
FIG. 7 is a plan view of the kingpin clamping assembly of the fifth wheel, the view being along line 7—7 in FIG. 6; and, FIG. 8 is a schematic illustration of the coupling assembly during a trailer and tractor coupling operation.

A suitable fifth wheel structure for supporting carrier member 28 and achieving coupled engagement with the trailer kingpin is illustrated in FIGS. 6 and 7 of the drawing. In this respect, fifth wheel 10 includes a top support plate portion 78 provided with a radial extending slot 80 having a diverging entrance 82 leading therefrom toward the periphery of the fifth wheel. As is well known, slot 80 is adapted to receive a kingpin 84 which is suitably secured to the bottom of trailer B. Kingpin 84 extends beneath wall 78 and is provided with a peripheral flange 86. In the embodiment illustrated, the fifth wheel is provided with a peripheral circular wall 88 and an outwardly extending peripheral support flange 90 which rotatably supports circular portion 32 of carrier member 28. Retainer plates 91 overlie circular portion 32 and are bolted to wall 88, and bearing plates 92 or other suitable bearing means are provided between support flange 90 and circular portion 32 and between the circular portion and retainer plates 91 to enhance pivotal movement of the carrier member relative to the fifth wheel.

A support member 94 extends transversely of the fifth wheel beneath wall 78 and is suitably interconnected such as by welding with wall 78 and peripheral wall 88 of the fifth wheel. Support member 94 supports a pair of pivotal clamping members 96 which are adapted to be moved between open and closed positions with respect to kingpin 84 to releaseably interengage the tractor and trailer. Each of the clamping members 96 has an end pivotally interconnected with support member 94 by a corresponding pivot pin 98, and each of the members is provided with an operating lever 100 having an end pivotally interconnected with the corresponding clamping member by means of pin 102. The other ends of levers 100 are pivotally interconnected with a common actuator rod 104 which is the piston rod member of an air motor 106 suitably mounted on the underside of fifth wheel wall 78. Air motor 106 is adapted to be controlled from within the cab of tractor A in a well known manner to cause reciprocation of rod 104 to pivot clamping members 96 between the open and closed positions thereof.

Preferably, fifth wheel 10 is adapted to be vertically reciprocated relative to the bed of tractor A to facilitate adjusting the vertical position of the fifth wheel to accommodate coupling engagement with trailers having different distances between the ground and the kingpin when the kingpin axis is disposed vertically. Accordingly, bed 108 of the tractor supports a hydraulic piston and cylinder unit 110 having a piston rod 112 suitably secured to support member 94 of the fifth wheel, whereby actuation of the hydraulic motor provides for reciprocating the fifth wheel and thus carrier member 28 vertically relative to the tractor bed.

With regard to the operation of the coupling assembly, it will be presumed that a trailer has been uncoupled with respect to a primary tractor and that the operator thereof has manually coupled trailer service lines 24 to corresponding trailer couplings 14, 16 and 18, thus connecting the air supply passages and electrical conductors in coupling member 22 with the appropriate supply lines for the air brakes and lights of the trailer. Tractor A is then positioned relative to the parked trailer for the kingpin of the trailer to enter slot 80 upon movement of the tractor toward the trailer. At this time, of course, air cylinder 106 is actuated for clamping members 96 to be in the open positions thereof as indicated by broken lines in FIG. 7.

Ideally, tractor A is moved toward engagement with trailer B along a path parallel to a plane through the axis of the trailer kingpin and perpendicular to front wall 12, whereby the trailer kingpin enters the fifth wheel slot and service line coupling members 20 and 22 are in alignment for mating engagement as the tractor approaches the trailer. Should such ideal conditions exist, the projection on coupling member 22 enters the recess in coupling member 20 for the faces of the projection and recess to properly engage one another. Upon such engagement, and continued movement of the kingpin to its final position in the fifth wheel recess, coupling member 22 pushes coupling member 20 along arms 34 of the carrier member against the bias of tension springs 70. Thus, the tension of spring 70 forces the faces of coupling members 20 and 22 into tight sealing engagement. Moreover, as mentioned hereinabove, such displacement capability of coupling member 20 along the carrier arm facilitates use of the coupling arrangement with trailers having kingpins spaced different distances from the front wall of the trailer.

When the tractor and trailer are in the coupled position, the tractor driver actuates air cylinder 106 to close clamping members 96 about kingpin 84. Preferably, the air supply for air cylinder 106 is connected with air cylinder 54 on coupling member 20 so that actuation of clamping members 96 to the closed position is accompanied by movement of locking pin 58 downwardly to interengage coupling members 20 and 22. It will be appreciated that suitable supply lines and controls, not illustrated, can be provided to achieve coordinated operation of air cylinders 106 and 54 in this manner. Further, it will be appreciated that actuation of air cylinder 106 to move clamping members 96 to the open position thereof is likewise accompanied by withdrawal of pin 58 from recess 62 in coupling member 22.

Figure 8:
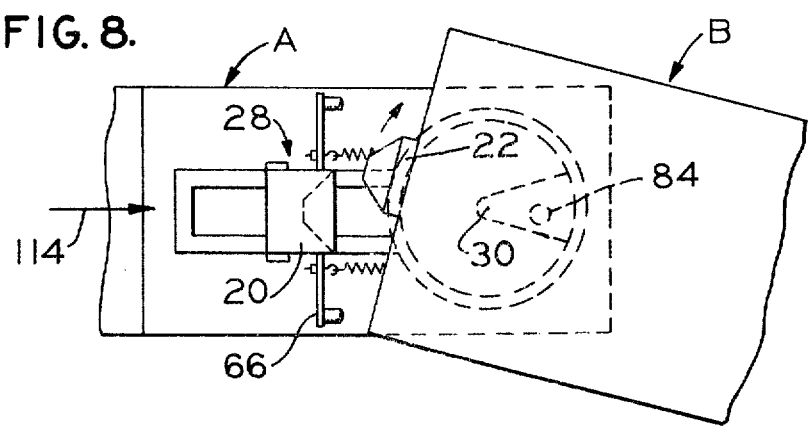

As mentioned, coupling movement between the tractor and trailer in the foregoing manner is ideal. In practice, however, it is practically impossible to provide perfect alignment between the tractor and trailer during movement thereof into coupled relationship. Most often, the tractor and trailer are skewed, as illustrated in FIG. 8. As is well known, the radial direction of the kingpin slot in the fifth wheel of tractor A is fixed, whereby movement of tractor A in the direction of arrow 114 relative to the kingpin 84 of stationarily positioned trailer B will result in movement of the kingpin and fifth wheel into coupled relationship. However, the skewed relationship between the tractor and trailer provides for the front wall of the trailer to be disposed at an angle with respect to the longitudinal axis of tractor A. Accordingly, when the skewed tractor and trailer are moved into coupled relationship, coupling member 20 on the tractor must be displaced so as to be positioned for mating engagement with coupling member 22 on the trailer when coupled relationship between the tractor and trailer is achieved.

In accordance with the present invention, such orientation of coupling member 20 is provided for by positioning arm 66. In this respect, with reference to FIG. 8, it will be seen that one end of arm 66 engages the front wall of the trailer as the latter moves in the direction of arrow 114 and prior to positioning of kingpin 84 in coaxial relationship with fifth wheel axis 30. When wall 12 of the trailer engages arm 66 carrier member 28 is pivoted clockwise relative to the fifth wheel about axis 30. Such rotation continues as tractor A moves toward trailer B thus moving arm 16 toward a parallel relationship with respect to trailer wall 12 and moving female coupling member 20 into alignment with male coupling member 22 for mating engagement therebetween. It will be appreciated that pivotal movement of carrier member 28 relative to axis 30 also facilitates relative pivotal movement between the tractor and trailer during movement of the trailer by the tractor following coupling thereof.

When it is deisred to uncouple the tractor and trailer, the operator actuates the control for air cylinder 106 to release clamping fingers 96 from the trailer kingpin and to withdraw pin 58 from interengaged relationship with coupling members 20 and 22. Thereafter, the tractor can be driven away from the trailer and nothing further is required to disconnect the tractor and trailer air and electrical supply lines. Accordingly, it will be appreciated that the supply line coupling arrangement advantageously enables coupling and uncoupling of a tractor and trailer without the tractor driver having to leave the cab area to perform any manual supply line coupling operations.

While considerable emphasis has been placed herein on the specific structure of certain components of the coupling assembly, it will be appreciated that many changes and modifications can be made without departing from the principles of the present invention. In this respect, for example, supply line coupling members having matingly engageable structures other than the projection and recess structure illustrated can readily be provided and, in the embodiment illustrated, the male and female relationship of the coupling members can be reversed without affecting the mating engagement and operation thereof. Further, arrangements other than the positioning arm disclosed can be employed to achieve pivotal movement of the coupling member on the tractor in order to position the two coupling members for mating interengagement, and biasing arrangements other than tension springs 70 can be employed to bias the coupling member on the tractor toward the fifth wheel axis. For example, a biasing spring arrangement could be provided between the latter coupling member and the bridging portion of the carrier in the embodiment illustrated. Still further, it is only necessary that the positioning arm and coupling member on the tractor be reciprocable together along the arm of the carrier member and pivotal therewith whereby the positioning arm could be mounted on the carrier arm to achieve the latter relationship and the coupling member could be mounted on the positioning arm.

Still further, while it is preferred to mount the carrier member on the fifth wheel for pivotal movement relative thereto and to provide for the carrier member to be vertically reciprocable with the fifth wheel so that the coupling member thereon is properly positioned vertically relative to the coupling member on a given trailer, it will be appreciated that these features can be otherwise achieved. For example, the carrier member can be mounted on the tractor bed independent of the fifth wheel for rotation about an axis coinciding with the fifth wheel axis, and vertical reciprocation of the carrier member can be provided independent of reciprocable movement of the fifth wheel. Moreover, it will be appreciated that the versatility provided by the latter vertical adjustment features is not necessary in connection with the coupling arrangement of the present invention, whereby the fifth wheel and carrier member whether separate or structurally interrelated can be vertically fixed relative to the tractor bed.

In the embodiment herein disclosed, the trailer is illustrated as having a vertical front wall on which the corresponding coupling member of the assembly is mounted. However, it will be appreciated that a wide variety of trailer structures exist, certain of which may not have a front wall. Accordingly, it will be appreciated that in the absence of a front wall, any suitable support member can be employed for attaching and properly positioning the coupling member adjacent the front end of the trailer. For example, a flat bed trailer having no front wall could be provided with a mounting plate extending upwardly from the bed and on which the coupling member would be suitably mounted.

With regard to the tractor and trailer supply lines to be coupled, it will be appreciated that supply lines other than air and electrical lines can be included. For example, the coupling members may include passageways for hydraulic service lines to connect a source of hydraulic fluid on the tractor with hydraulically actuated devices on the trailer. Moreover, while the service line coupling members are described as being in facially sealed engagement when coupled, it will be appreciated that the junctures between aligned openings in the members for air or liquid supply can be provided with suitable sealing arrangements if necessary. Still further, while the invention has been described in conjunction with a spotting tractor and finds particular utility in conjunction with such tractors, it will be appreciated that the coupling assembly can be employed in conjunction with primary tractor devices as well.

What is claimed is:

1. A coupling assembly for releaseably interconnecting supply lines of a tractor having a fifth wheel and corresponding supply lines on a trailer having front wall means and a kingpin interengageable with said fifth wheel comprising, mating male and female supply line coupling block members, each said block member including coupling connection means, one of said male and female coupling block members being mounted on said trailer wall means, means supporting the other of said male and female coupling block members on said tractor for mating engagement with said said one coupling block member upon relative movement of said tractor and trailer to bring said fifth wheel and kingpin into interengagement, said fifth wheel having an axis, said supporting means including carrier means supported on said fifth wheel for pivotal movement about said axis, said carrier means including arm means extending radially of said axis, means mounting said other coupling block member on said arm means for sliding movement therealong, and means biasing said other coupling block member to slide toward said axis.

2. A coupling assembly for releaseably interconnecting supply lines of a tractor having a fifth wheel and corresponding supply lines on a trailer having front wall means and a kingpin interengageable with said fifth wheel comprising, mating male and female supply line coupling means, one of said male and female coupling means being mounted on said trailer wall means, means supporting the other of said male and female coupling means on said tractor for mating engagement with said one coupling means upon relative movement of said tractor and trailer to bring said fifth wheel and kingpin into interengagement, said supporting means including carrier means supporting said other coupling means for movement relative to said fifth wheel, said fifth wheel having an axis, said carrier means supporting said other coupling means for pivotal movement about said axis, and positioning means supported by said carrier means for engaging said trailer wall during said relative movement of said tractor and trailer to pivot said carrier means about said axis.

3. The coupling assembly according to claim 6, wherein said positioning means includes arm means interconnected with said other coupling means and extending in laterally opposite directions with respect to said axis, each said arm means having outer ends for engaging said trailer wall.

4. A coupling assembly for releaseably interconnecting supply lines of a tractor having a fifth wheel and corresponding supply lines on a trailer having front wall means and a kingpin interengageable with said fifth wheel comprising, mating male and female supply line coupling means, one of said male and female coupling means being mounted on said trailer wall means, means supporting the other of said male and female coupling means on said tractor for mating engagement with said one coupling means upon relative movement of said tractor and trailer to bring said fifth wheel and kingpin into interengagement, said supporting means including carrier means supporting said other coupling means for movement relative to said fifth wheel, said fifth wheel having an axis, said carrier means supporting said other coupling means for pivotal movement about said axis, and means biasing said carrier means to position said other coupling means laterally centrally of said tractor.

5. A coupling assembly for releaseably interconnecting supply lines of a tractor having a fifth wheel and corresponding supply lines on a trailer having front wall means and a kingpin interengageable with said fifth wheel comprising, mating male and female supply line coupling means, one of said male and female coupling means being mounted on said trailer wall means, means supporting the other of said male and female coupling means on said tractor for mating engagement with said one coupling means upon relative movement of said tractor and trailer to bring said fifth wheel and kingpin into interengagement, said supporting means including carrier means supporting said other coupling means for movement relative to said fifth wheel, said fifth wheel having an axis, said carrier means supporting said other coupling means for pivotal movement about said axis, said carrier means further supporting said other coupling means for reciprocating movement toward and away from said axis, and means biasing said carrier to position said other coupling means laterally centrally of said tractor.

6. The coupling assembly according to claim 5, and positioning means supported by said carrier means for engaging said trailer wall during said relative movement of said tractor and trailer to pivot said carrier means about said axis.

7. A coupling assembly for releaseably interconnecting supply lines of a tractor having a fifth wheel and corresponding supply lines on a trailer having front wall means and a kingpin interengageable with said fifth wheel comprising, mating male and female supply line coupling means, one of said male and female coupling means being mounted on said trailer wall means, means supporting the other of said male and female coupling means on said tractor for mating engagement with said one coupling means upon relative movement of said tractor and trailer to bring said fifth wheel and kingpin into interengagement, said supporting means including carrier means supporting said other coupling means for movement relative to said fifth wheel, said fifth wheel having an axis, said carrier means supporting said other coupling means for pivotal movement about said axis, said carrier means further supporting said other coupling means for reciprocating movement toward and away from said axis, and means biasing said carrier means to position said other coupling means laterally centrally of said tractor.

8. A coupling assembly for releaseably interconnecting supply lines of a tractor having a fifth wheel and corresponding supply lines on a trailer having front wall means and a kingpin interengageable with said fifth wheel comprising, mating male and female supply line coupling means, one of said male and female coupling means being mounted on said trailer wall means, means supporting the other of said male and female coupling means on said tractor for mating engagement with said one coupling means upon relative movement of said tractor and trailer to bring said fifth wheel and kingpin into interengagement, said supporting means including carrier means supporting said other coupling means for movement relative to said fifth wheel, said fifth wheel having an axis, said carrier means supporting said other coupling means for pivotal movement about said axis, said carrier means further supporting said other coupling means for reciprocating movement toward and away from said axis, and positioning means supported by said carrier means for engaging said trailer wall during said relative movement of said tractor and trailer to pivot said carrier about said axis.

9. A coupling assembly for releaseably interconnecting supply lines of a tractor having a fifth wheel and corresponding supply lines on a trailer having front wall means and a kingpin interengageable with said fifth wheel comprising, mating male and female coupling means, one of said coupling means being mounted on said trailer wall means laterally centrally thereof, said fifth wheel having an axis coinciding with the axis of said kingpin when said kingpin and fifth wheel are interengaged, carrier means supported by said fifth wheel for pivotal movement in opposite directions about said fifth wheel axis, said carrier including radially extending arm means, means interengaging the other of said coupling means and said arm means for said arm means to support said other coupling means for reciprocating movement radially of said fifth wheel axis, positioning means movable with said other coupling means and extending laterally thereof with respect to said fifth wheel axis to engage said trailer wall means upon movement of said kingpin and fifth wheel into interengagement, and means to bias said other coupling menas and positioning means along said arm means toward said fifth wheel axis.

10. The assembly according to claim 9, and means for locking said male and female coupling means in mating relationship.

11. The assembly according to claim 10, wherein said male and female coupling means include corresponding coupling bodies, said female body having a recess and said male body having a projection receivable in said recess, said locking means including pin means and said bodies having openings aligned to receive said pin means when said projection is in said recess.

12. The assembly according to claim 11, and motor means to reciprocate said pin means axially of said opening.

13. The assembly according to claim 12, and means biasing said carrier means against pivotal movement in opposite directions about said fifth wheel axis relative to a reference position for said arm means.

14. The assembly according to claim 13, wherein said other coupling means includes a coupling body and said positioning means includes bar means extending laterally from said body, said bar means having laterally opposite ends for engaging said trailer wall during movement of said kingpin and fifth wheel into interengagement.

15. The assembly according to claim 14, wherein said means biasing said other coupling means and positioning means is tension spring means between said bar means and carrier means.

16. The assembly according to claim 14, wherein said one coupling means includes a coupling body, said coupling bodies having matingly contoured projection and recess means, motor actuated pin means mounted on the body of said other coupling means for locking said bodies in mating engagement, said bodies having openings aligned to receive said pin means when said bodies are in mating engagement.

* * * * *